US006072946A

United States Patent [19]
Dooley et al.

[11] Patent Number: 6,072,946
[45] Date of Patent: Jun. 6, 2000

[54] COMPUTERIZED METHOD AND SYSTEM FOR INTERACTIVELY SIMULATING TELECOMMUNICATIONS SERVICES

[75] Inventors: Scott A. Dooley, Longmont; Randall B. Sparks, Lafayette; Kyle Habermehl, Longmont; A. Scott Wolff, Louisville, all of Colo.

[73] Assignees: MediaOne Group, Inc., Englewood; U S West, Inc., Denver, both of Colo.

[21] Appl. No.: 09/001,176

[22] Filed: Dec. 30, 1997

[51] Int. Cl.[7] ........................................ G09B 5/08
[52] U.S. Cl. ................ 395/500.34; 434/219; 434/222
[58] Field of Search ............................... 455/414, 423; 364/578; 434/224, 219, 222, 366, 379; 379/67.1

[56] References Cited

U.S. PATENT DOCUMENTS 5,257,185  10/1993  Farley et al. ............................ 707/100
5,727,950  3/1998  Cook et al. ............................. 434/350

FOREIGN PATENT DOCUMENTS 0289296  4/1988  United Kingdom ........... G09B 19/00

OTHER PUBLICATIONS

Lefkowitz, L.; Farrell, R.; Yoo, I.; A Knowledge–Based Intelligent Tutoring System for Telephony Operations Support Systems, Conference Record, IEEE International Conference on Communications, vol. 3, pp. 1880–1884, May 26, 1993.

*Primary Examiner*—Kevin J. Teska
*Assistant Examiner*—Douglas W. Sergent
*Attorney, Agent, or Firm*—Brooks & Kushman P.C.

[57] ABSTRACT

A computerized method and system for interactively simulating a plurality of telecommunications services operates in response to a user sending a message from his client computer across a data network to a server requesting to download on one of the service simulation programs. In response to the message from the client, the server provides the requested telecommunications service simulation program. The program provided by the server is downloaded and executed by the client. The downloaded program provides the user with an interaction experience representative of the selected one of the plurality of telecommunications services. This interaction experience may include additional communication between the service simulation program and the server. Additionally, the service simulation program provides guidance to the user in using and configuring both the service simulation program and, potentially, the actual telecommunications service to which the user has subscribed.

18 Claims, 15 Drawing Sheets

COMPUTERIZED METHOD AND SYSTEM FOR INTERACTIVELY SIMULATING TELECOMMUNICATIONS SERVICES

TECHNICAL FIELD

This invention relates to computerized methods and systems for interactively simulating telecommunications services.

BACKGROUND ART

Current and potential subscribers of telecommunications services, such as voice messaging services, call forwarding services, etc., often have difficulty understanding and learning how to use and configure the features of those services and, therefore, maximize their potential benefits. Textual descriptions of the features are usually inadequate for many people. Trialing of actual services coupled with coaching from a human expert on how to use them is logistically difficult and cost prohibitive for the service providers.

Thus, there exists a need for an interactive simulation of various telecommunications services that enables subscribers to easily learn about, practice using, and initiate and configure the services in a cost-effective manner.

DISCLOSURE OF THE INVENTION

It is a general object of the present invention to provide a computerized method and system for interactively simulating telecommunications services.

In carrying out the above object and other objects, features, and advantages of the present invention, a computerized method is provided for interactively simulating a plurality of telecommunications services to a user. The method includes the step of sending a first message over a data network to a server. The method also includes the step of displaying a screen to the user in response to the first message wherein the screen allows the user to select any one of a plurality of telecommunications services for simulation. Upon sending a second message to the server indicating selection of one of the plurality of telecommunications services, a selected simulation program is sent by the server.

In further carrying out the above object and other objects, features, and advantages of the present invention, a system is also provided for carrying out the steps of the above described method. The system includes a client computer for sending a first message. The system also includes a display coupled to the client computer for displaying a first screen based on the simulation program wherein the first screen allows the user to select any one of the plurality of telecommunications services for simulation. The client computer is also provided for sending a second message to the server computer indicating selection of one of the plurality of telecommunications services and receiving a selected simulation program in response to the second message, the selected simulation program representative of the selected one of the plurality of telecommunications services.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
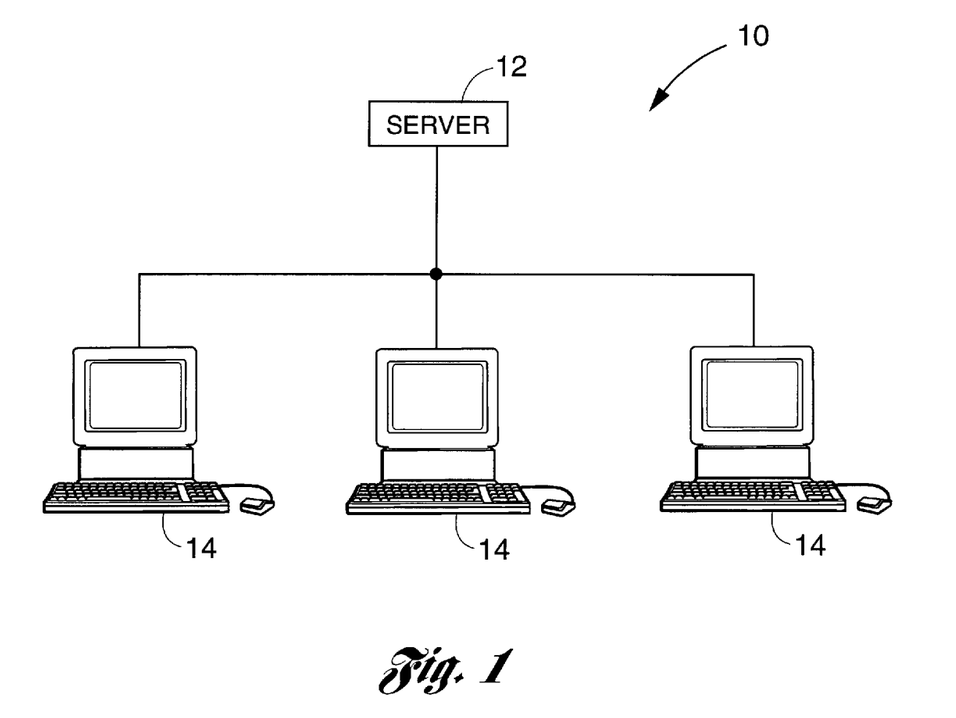
FIG. 1 is a schematic diagram illustrating the system of the present invention.

Turning now to FIG. 1, there is shown a schematic diagram of the system of the present invention, denoted generally by reference numeral 10. The system 10 includes a server 12 and at least one client 14 attached to a data network. Each client 14 is a data processing interface, such as a personal computer.

Although capable of being deployed on many data networks, currently the best way to provide interactive telecommunication simulations is via the Internet and the World Wide Web (Web). In a Web-based deployment, the user executes a Web browser on their computer (client 14) and chooses a simulation to interact with via a page displayed by the Web browser. The corresponding Web server then provides the simulation program in the form of a Java applet (TM Sun Microsystems), or other interactive, Web-based application types such as a Shockwave application (TM MacroMedia), an ActiveX Control application (TM Microsoft), or a VRML World (TM Silicon Graphics). The Web browser executing on the client 14, in turn, executes the downloaded simulation program, also on the client 14. The simulation program provides a user interface (screens) that allow the user to interact with the simulation as if he or she had subscribed to the actual service. The simulation program also provides assistance to the user both in using the service and in configuring their simulated and actual service (if the user has subscribed to the actual service). In addition to supplying the simulation program for downloading, the Web server executes additional programs that can communicate with the simulation program.

Figure 2A:
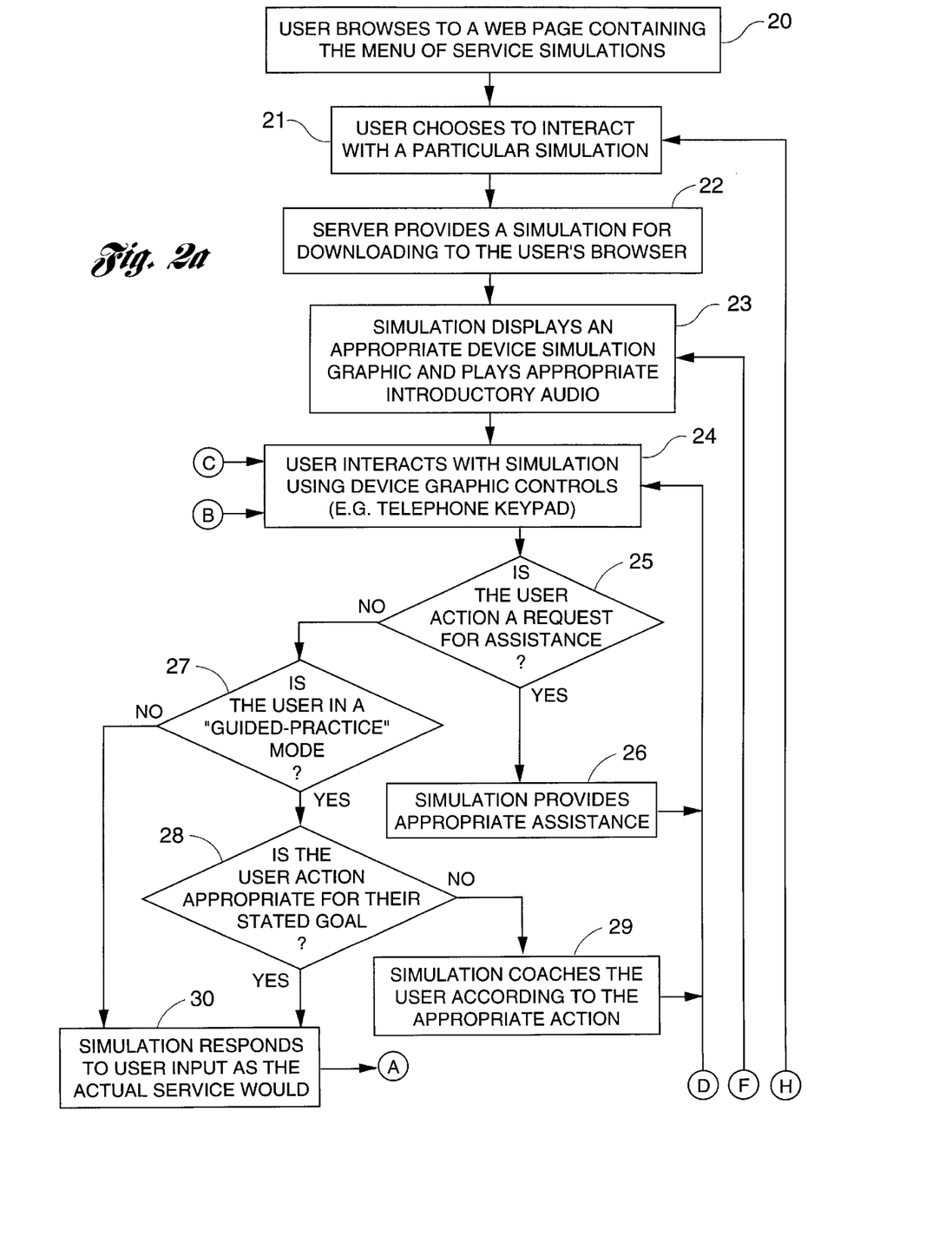
FIGS. 2a–2c are flow diagrams illustrating the general sequence of steps associated with the present invention.
Figure 2B:
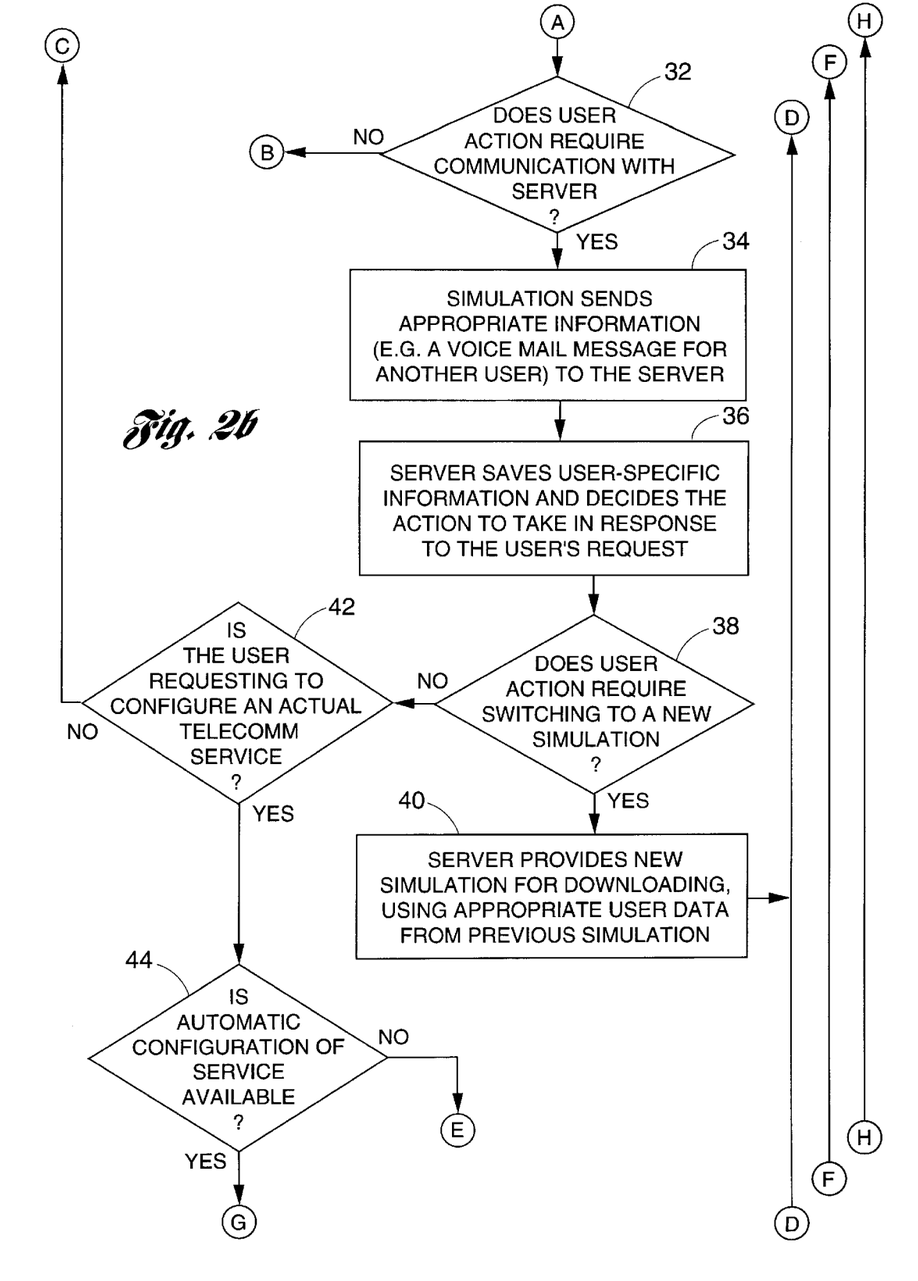
Figure 2C:
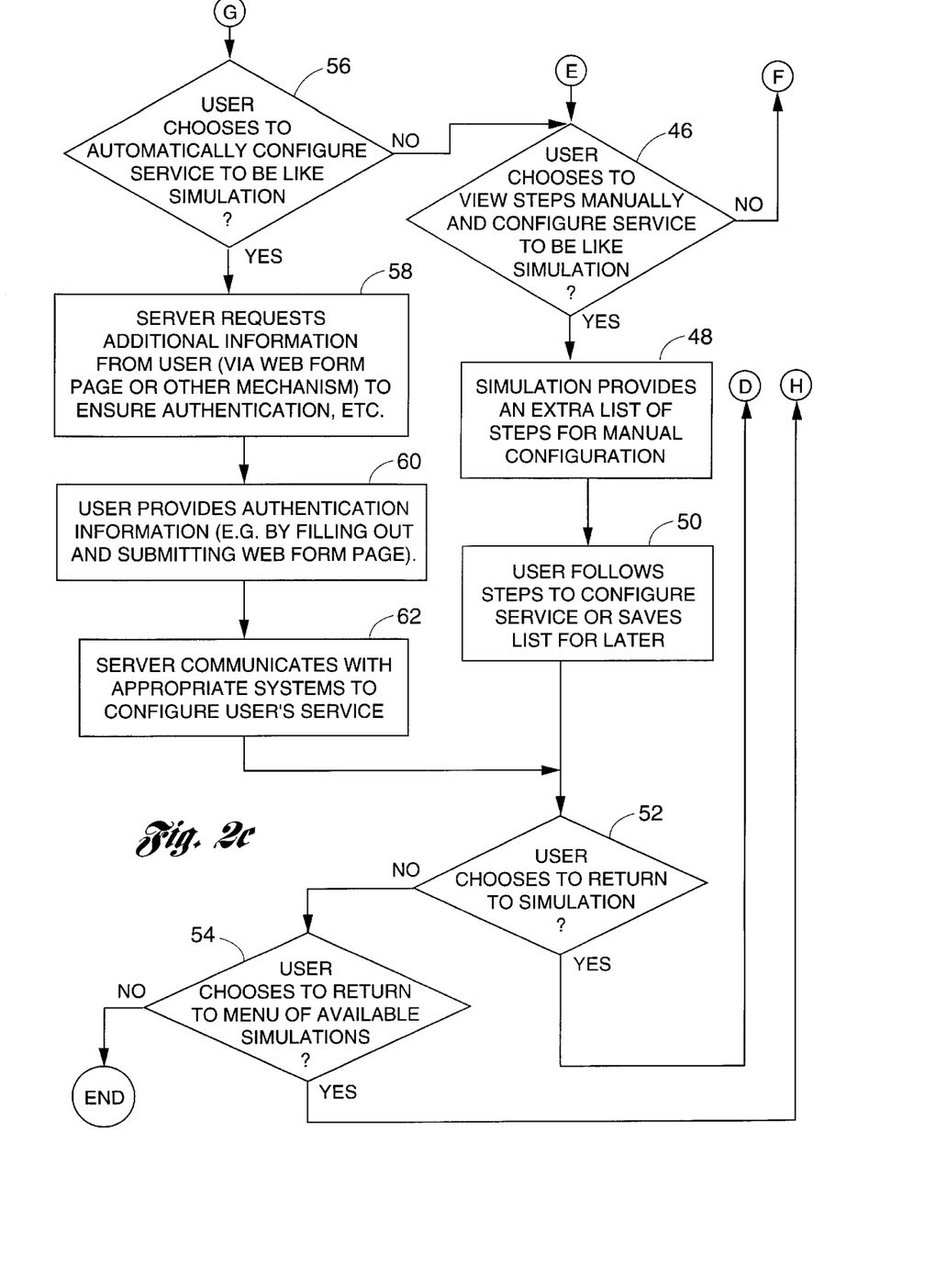

Turning now to FIGS. 2a–2c, there are shown flow diagrams illustrating the general sequence of steps associated with interactively simulating any one of a plurality of telecommunications services offered by a service provider. The possible telecommunications services offered may include voice messaging, three-way calling, call waiting, call forwarding, speed dialing/calling, etc. First, the user browses to a Web page containing the menu of service simulations and selects one of the available simulations, as shown at blocks 20 and 21, respectively.

Figure 3:
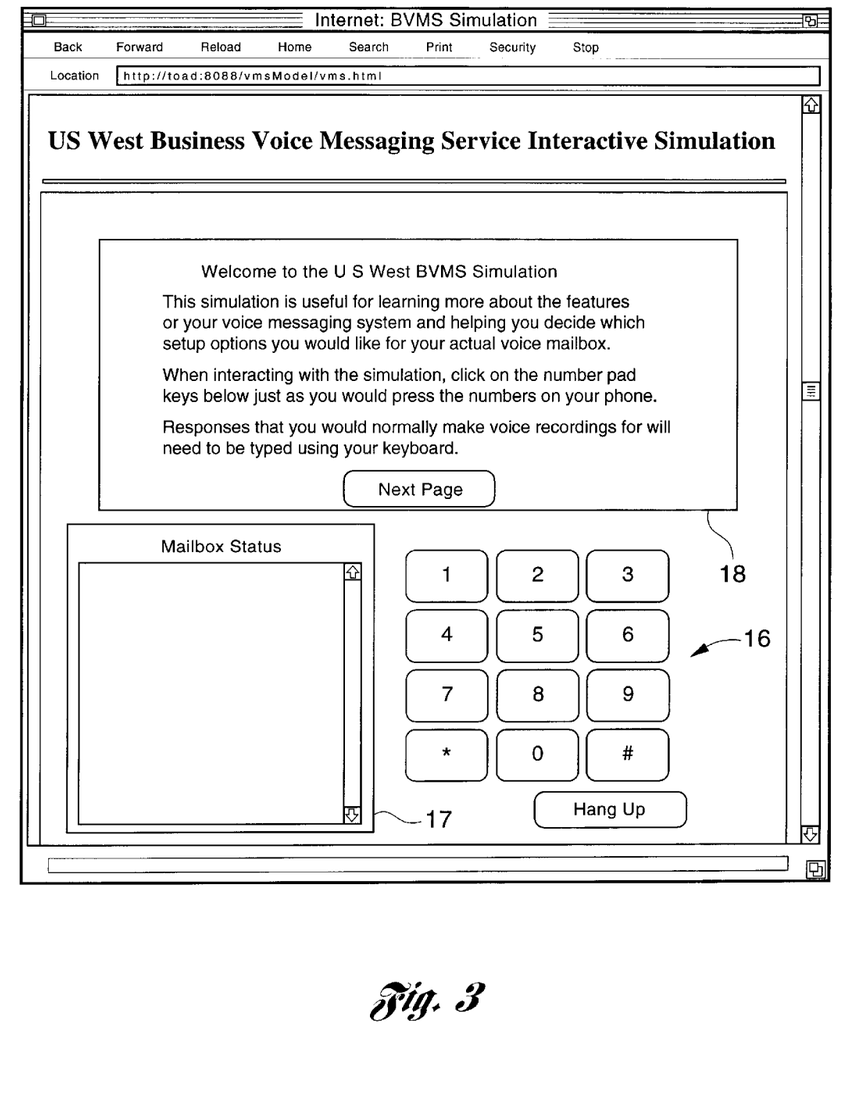
FIG. 3 is an exemplary image of an initial menu screen display.

The server 12 sends the selected simulation to the user/client 14 for downloading to the user's browser which then displays an appropriate device simulation graphic and plays an appropriate introductory audio, if any, as shown at blocks 22 and 23, respectively. For example, if the user selects the voice messaging simulation, then the downloaded program initially displays the screen shown in FIG. 3 which includes a telephone keypad 16, a panel 17 for displaying the user's mailbox configuration information and a display panel 18 for displaying prompts. The prompts are similar to the kind of prompts that a user would hear if he or she were using the actual telecommunications service and are verbal (which can be turned off by the user) and displayed in text. The prompts tell the user what his or her options are at any given point in time. The simulation can provide help to the user in understanding the prompts.

Figure 4:
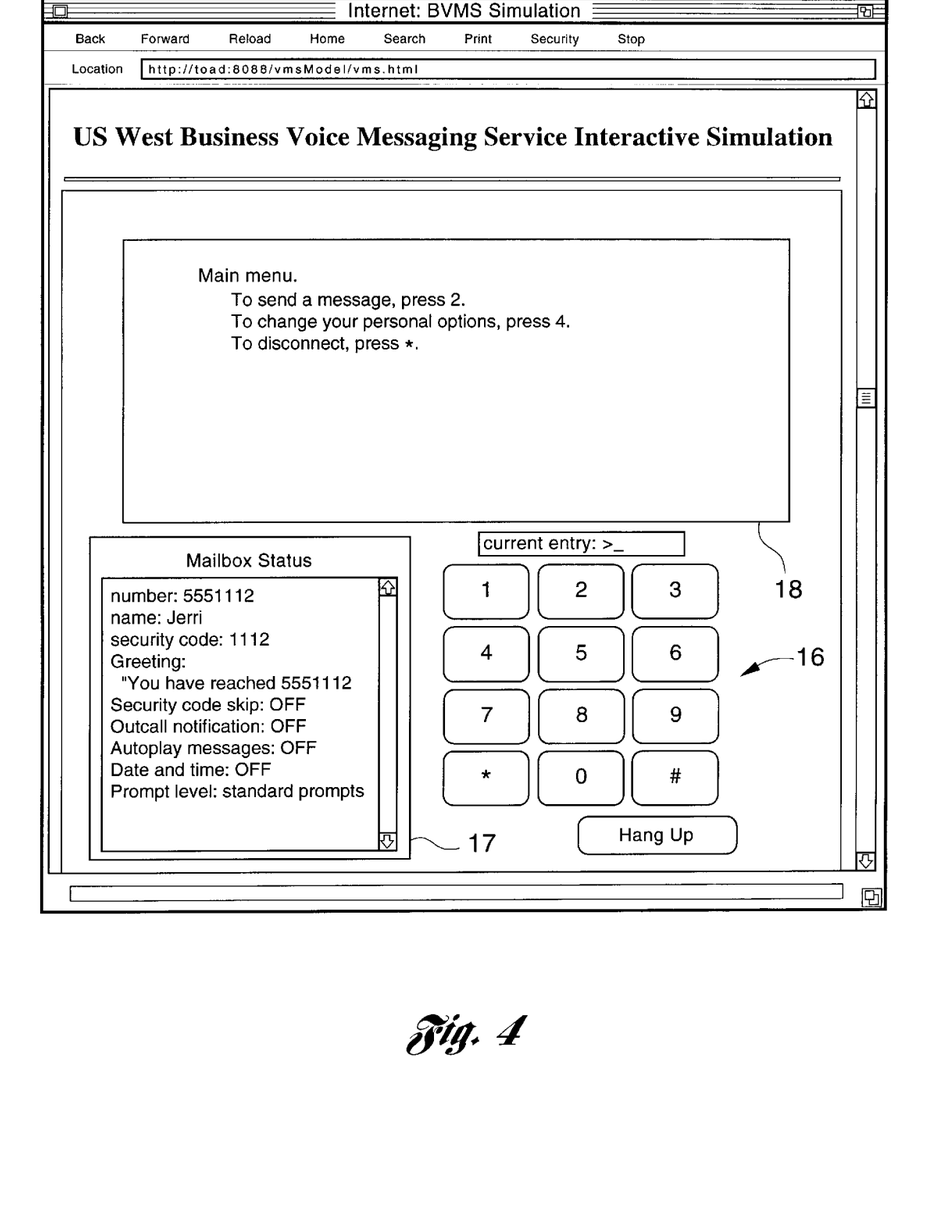
FIG. 4 is an exemplary image of a main usage menu screen display associated with the voice messaging service simulation.
Figure 5:
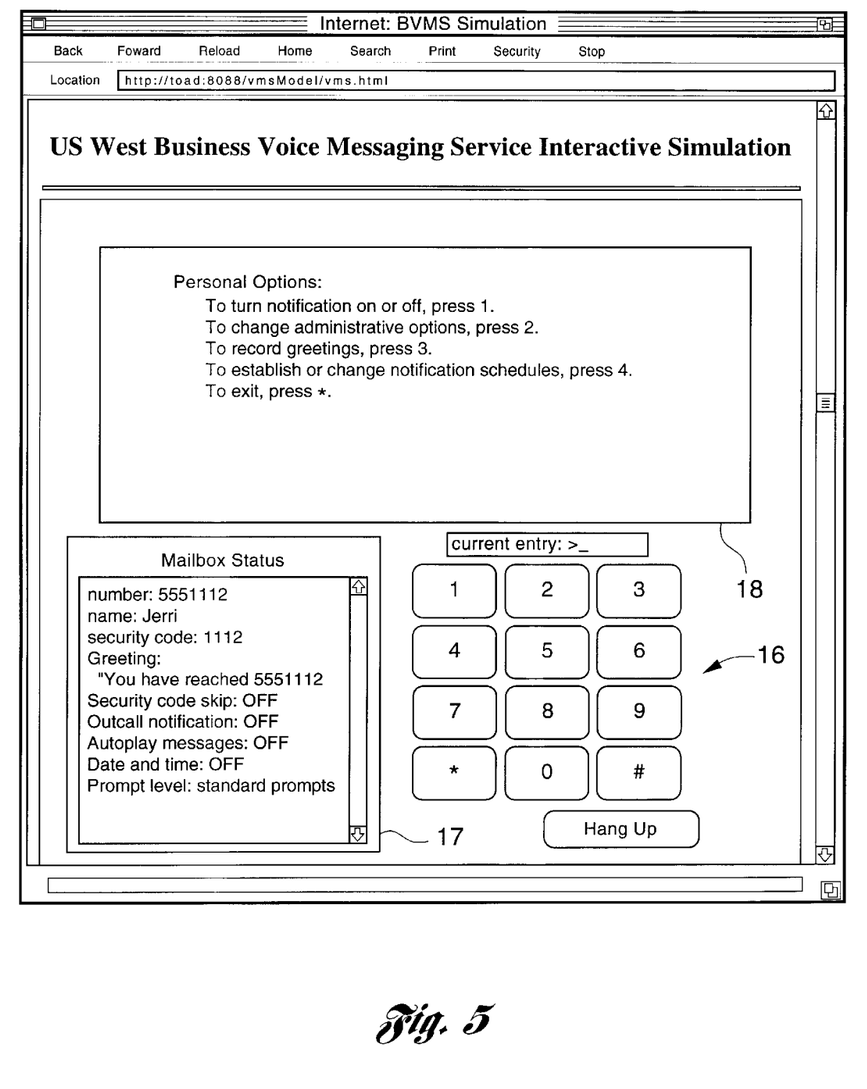
FIG. 5 is an exemplary image of a personal options screen display.
Figure 6:
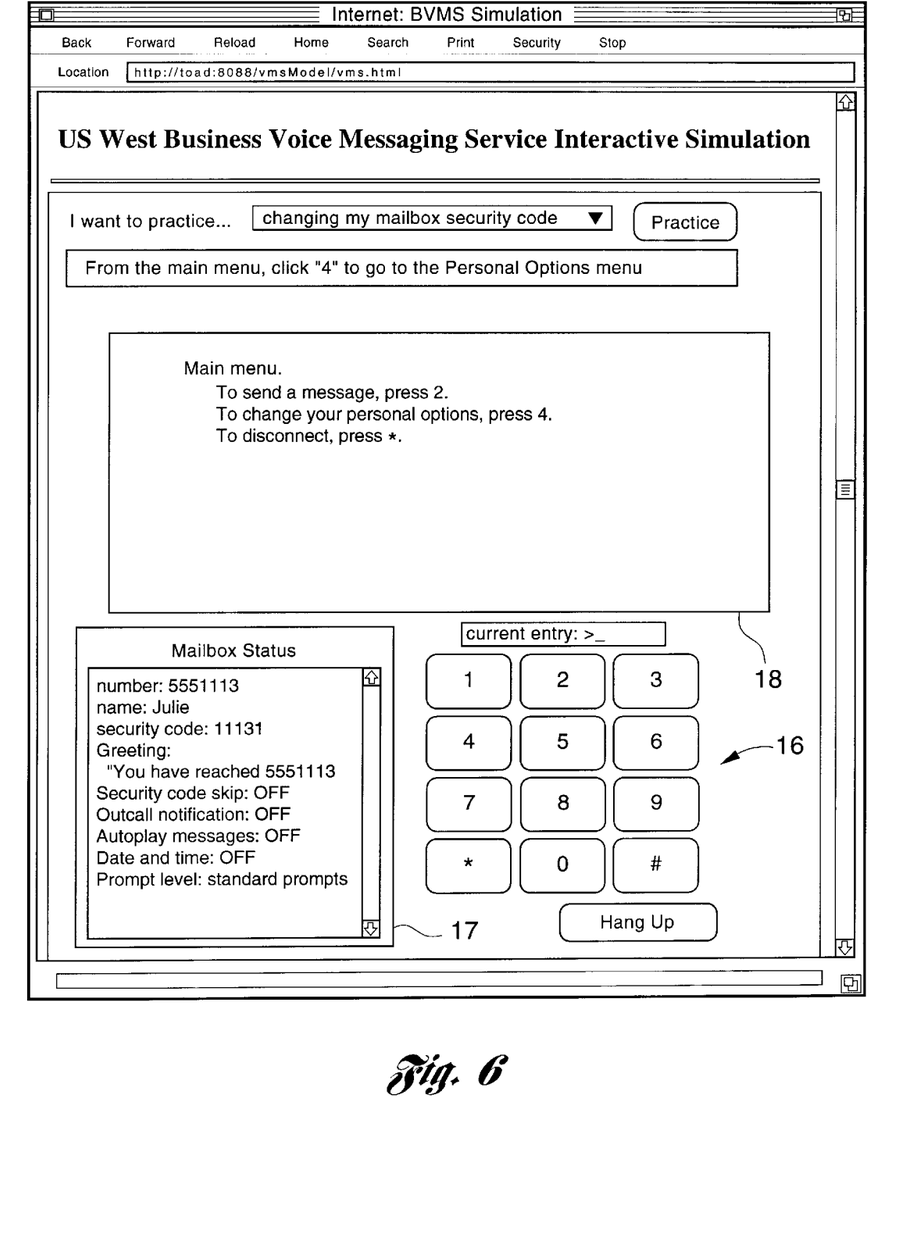
FIG. 6 is an exemplary image of a guided practice screen display.

Continuing with the voice messaging interaction, after successfully specifying a previously used, or creating a new simulated mailbox, the user is shown the "main menu" screen as depicted in FIG. 4. For illustration purposes, let us now assume that the user wishes to change their mailbox security code. If the user knows that the first step in this task is to select the "change Personal Options" menu item then he or she does so by clicking the "4" key on the keypad 16 and the simulation responds with the screen shown in FIG. 5. If the user does not know which menu item to choose, he can ask for assistance, or if he is using a simulation in a "Guided Practice mode", the simulation indicates that the next step in the task is to select "change Personal Options" as shown in FIG. 6. The user's choice of an option and corresponding keypad input selection is represented at block 24 in FIG. 2.

If the user action is a request for assistance, conditional block 25, the simulation provides the appropriate assistance, block 26. If the user action is not a request for assistance, and the user is in the "guided-practice" mode, conditional block 27, a determination is made as to whether the user action is appropriate, as shown at conditional block 28. If not, the simulation coaches the user according to the appropriate action, as shown at block 29. However, if the action is appropriate, the simulation responds to the input as the actual service would, as shown at block 30.

Figure 7:
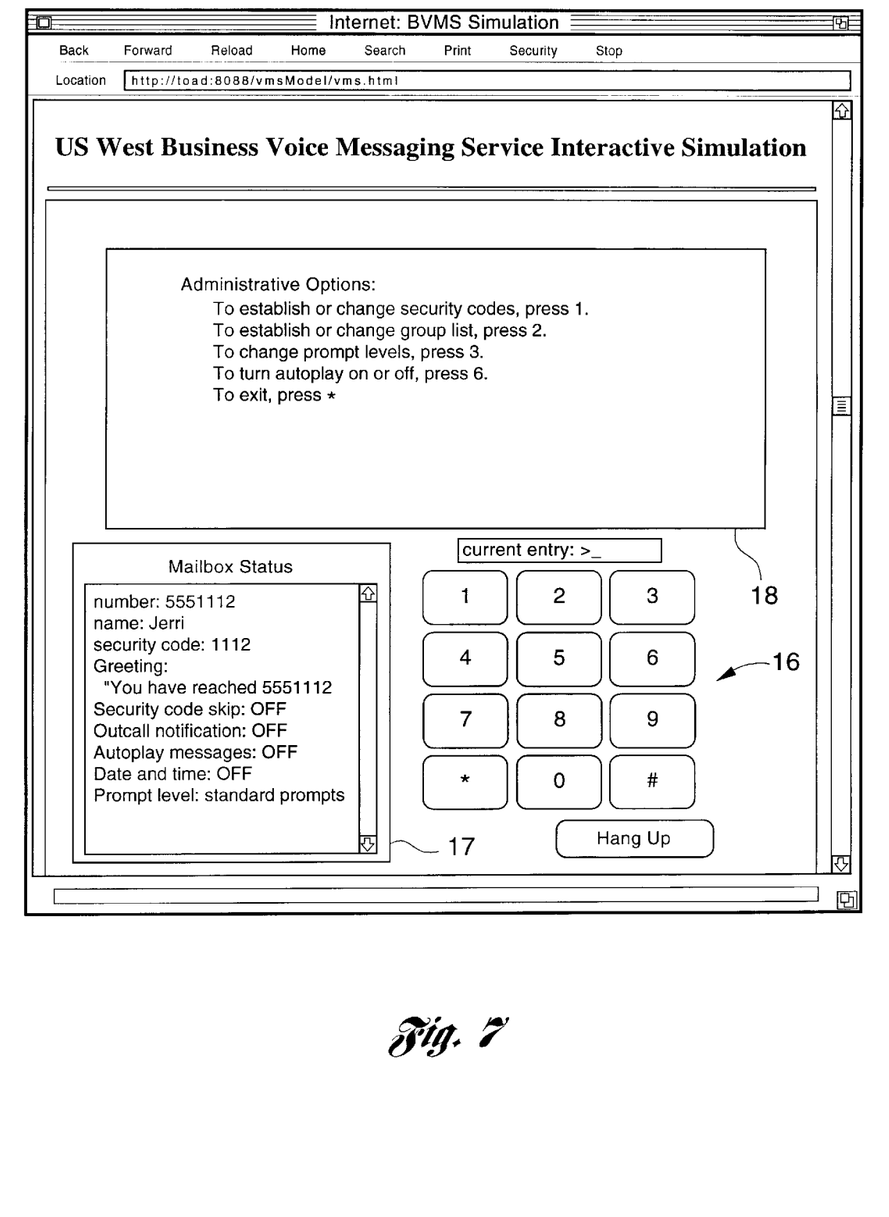
FIG. 7 is an exemplary image of an administrative options screen display.
Figure 8:
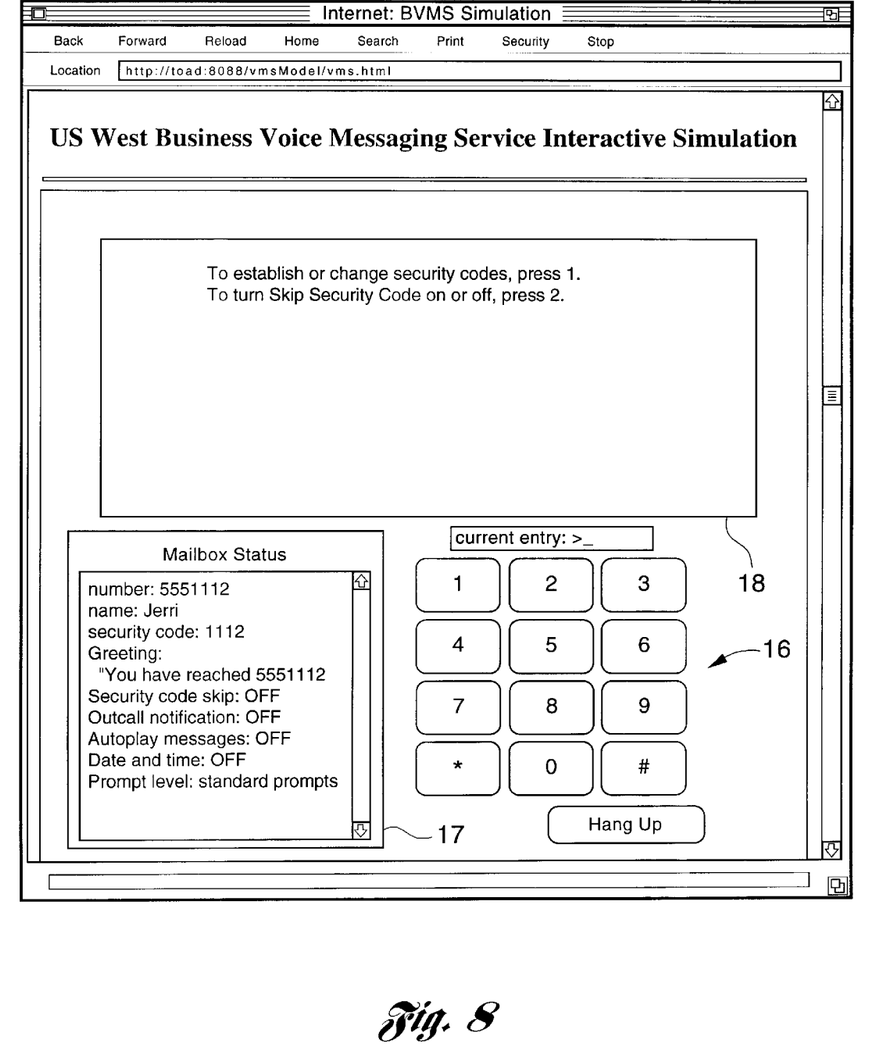
FIG. 8 is an exemplary image of a security code simulation display.

Continuing with the illustration, the exemplar screens displayed by the simulation in response to the user's actions of changing the mailbox security code and changing notification options are shown in FIGS. 7–13. For example, if the user wishes to establish or change security codes, the user presses "1", as shown in FIG. 7. At this point, the user is given the option to either "establish or change security codes" or "turn Skip Security Code on or off", as shown in FIG. 8, in response to pressing "1".

Figure 9:
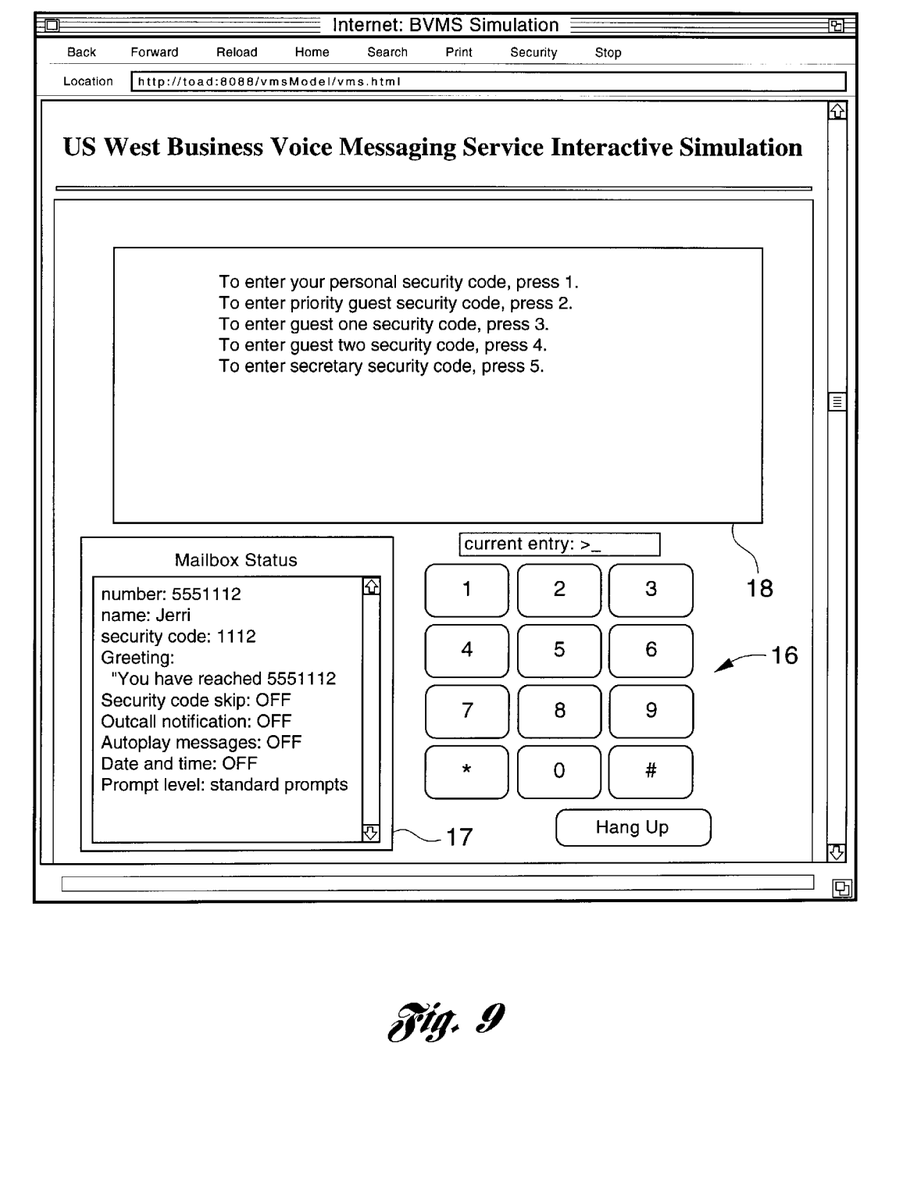
FIG. 9 is an exemplary image of a second security code simulation display.
Figure 10:
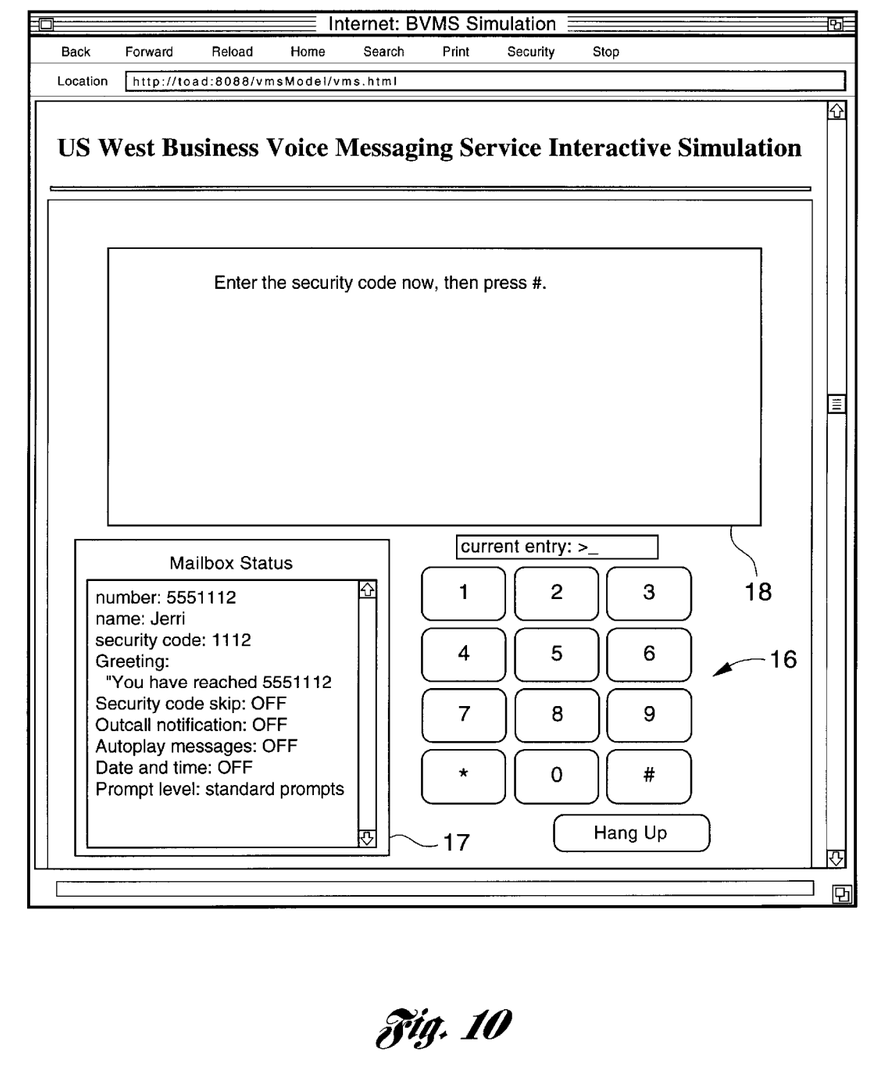
FIG. 10 is an exemplary image of a third security code simulation display.
Figure 11:
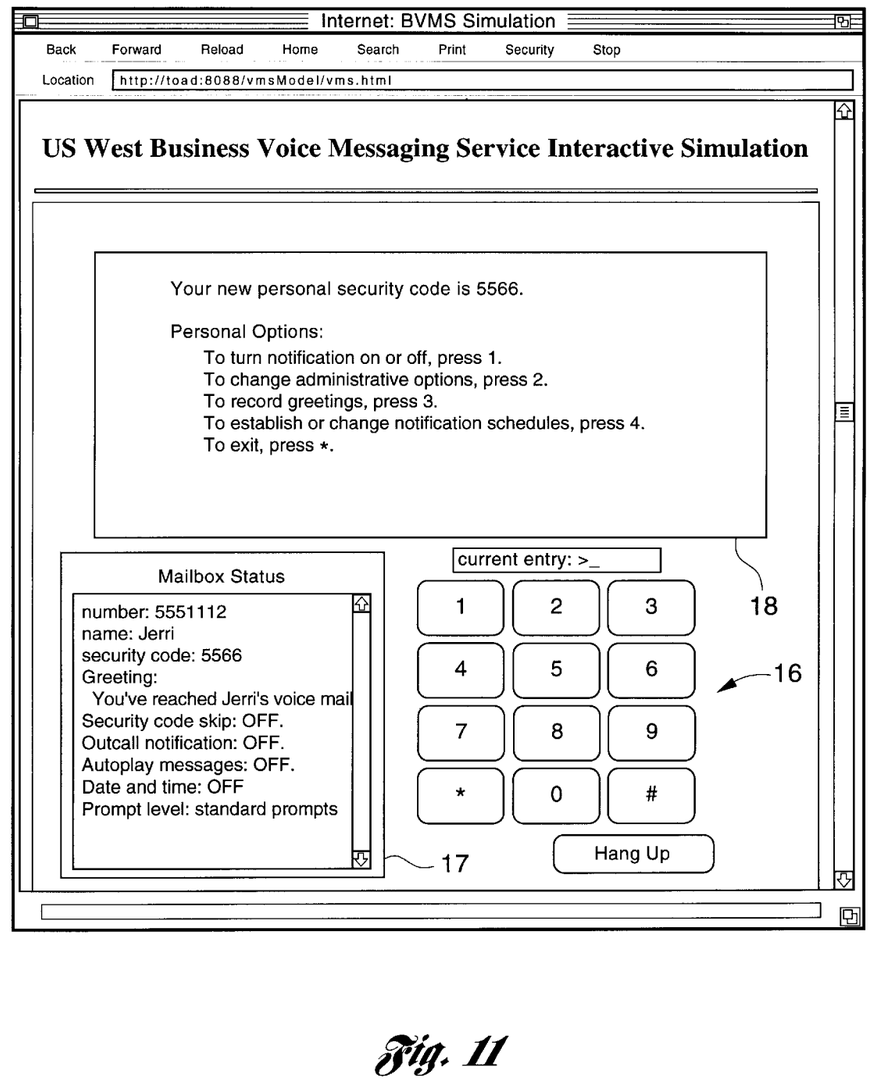
FIG. 11 is an exemplary image of a fourth security code simulation display.

If the user pressed "1," the screen shown in FIG. 9 appears, and the user is presented with new options. If the user wishes to enter a personal security code, he/she would then press "1," and the new screen image shown in FIG. 10 appears. At this point, the user is instructed to enter a security code, followed by the "#" key. Upon pressing the "#" key, screen image shown in FIG. 11 is displayed to the user.

Figure 12:
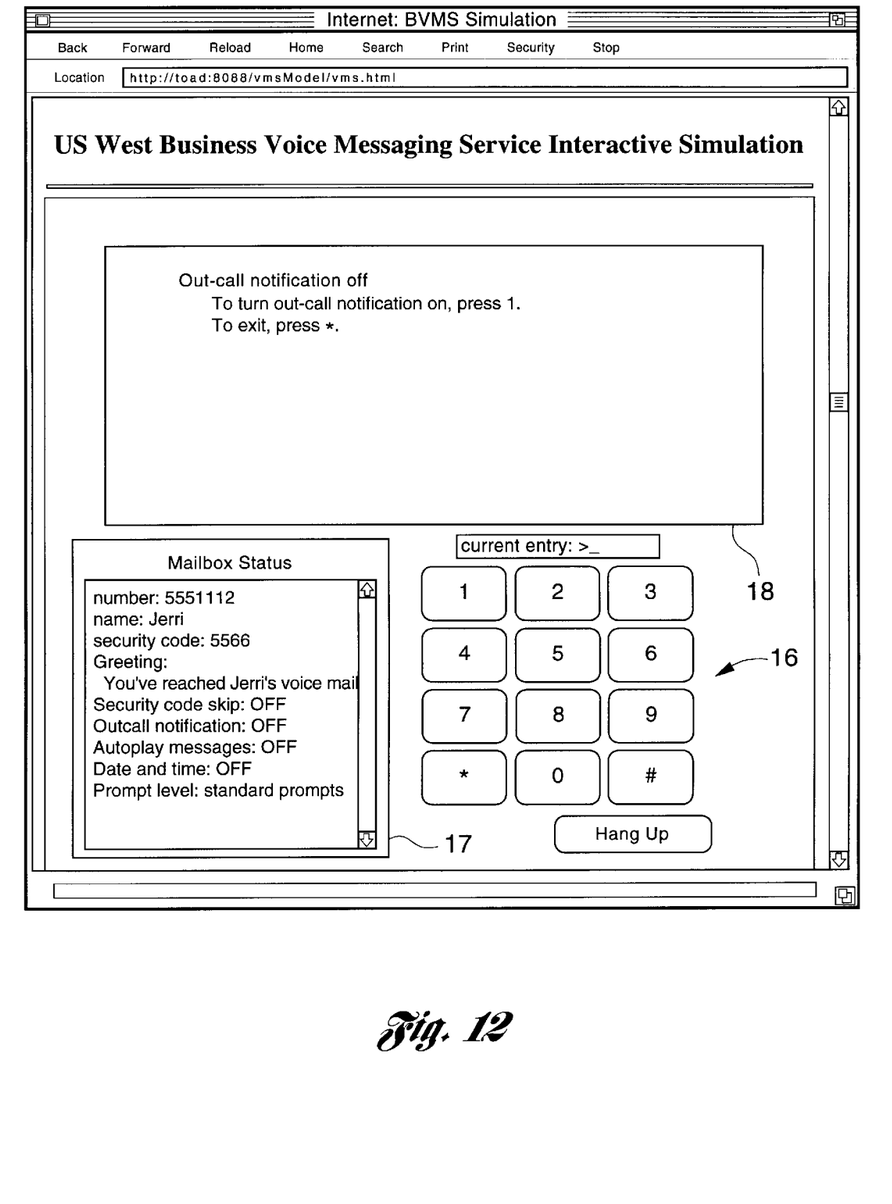
FIG. 12 is an exemplary image of an out-call notification simulation display.
Figure 13:
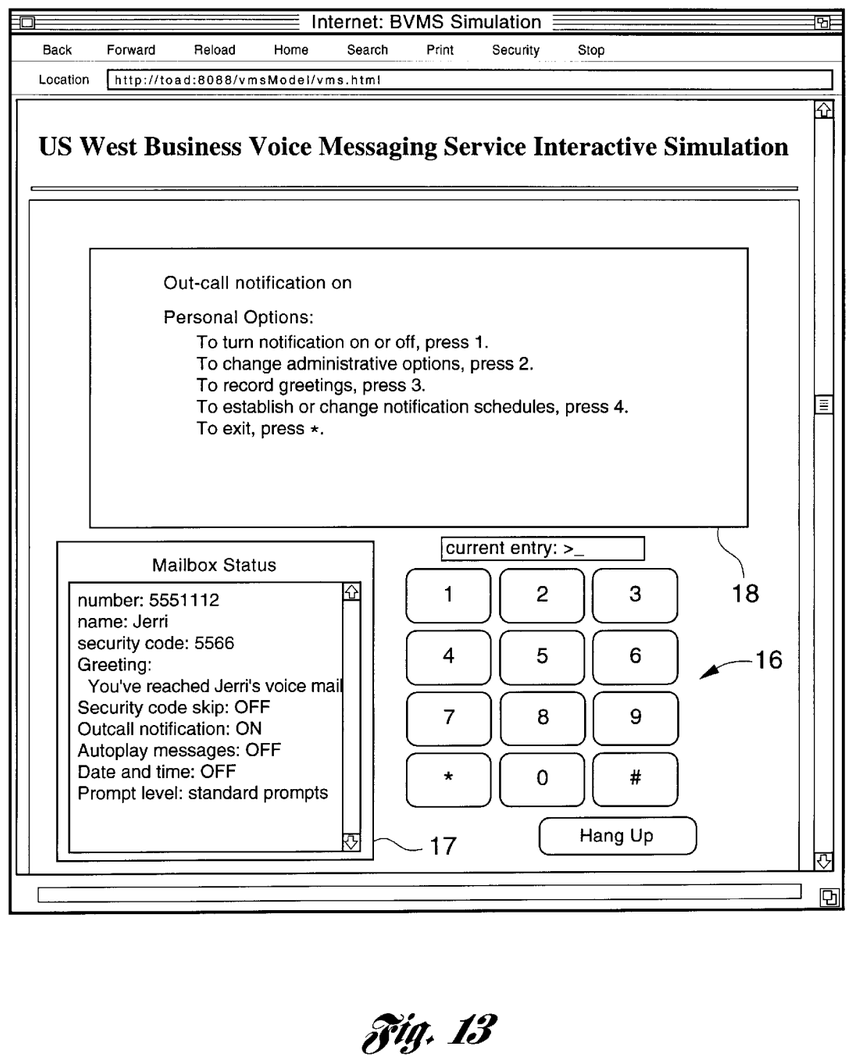
FIG. 13 is an exemplary image of a second out-call notification simulation display.

The security code entered by the user is displayed along with additional options available to the user. At this point, if the user wishes to continue with the simulation and simulate the option of turning notification on or off, he/she must press "1." Upon doing so, the screen image shown in FIG. 12 is displayed identifying the available options to the user. Assuming the user wishes to turn out-call notification on, he/she presses "1" as instructed by the simulation. The screen image shown in FIG. 13 is displayed, indicating to the user that he/she has turned out-call notification on.

Returning now to FIG. 2, as shown at conditional block 32, some user actions, such as saving a personalized greeting for the simulated mailbox, require the simulation program to send a message to the server. If the user action does not require communication with the server, the method continues. If communication is required then a message is sent from the simulated program (on the client 14) across the data network to the server, as shown at block 34. The server 12 saves the user-specific information and determines the appropriate action to take, as shown at block 36.

Another user action that requires communication with the server is a request to switch to another, related simulation, such as the simulation of a paging service. If the user action does require switching to a new simulation, as shown at conditional block 38, then the server uses data from the user's previous simulation use to configure the new simulation and then provides the program for downloading, as shown at block 40. The client 14 then downloads the new simulation and the user begins interacting with it, as shown at block 28.

If a new simulation is not required, the method proceeds to determine whether or not the user is requesting to configure an actual telecommunication service, as shown at conditional block 42. If not, e.g., the user is selecting to save a personal greeting, the method returns to block 28, as described above. This is because there is no user-visible action required by the server 12.

If the user action is a request to configure an actual telecommunications service (conditional block 42), the simulation can help the user do this manually and may even be able to do this automatically, depending on the service. If automatic configuration is available, conditional block 44, the user is given this option. If it is not available or if the user chooses not to use it, conditional block 56, the user may then decide if he/she wishes to view the steps needed to manually configure the actual telecommunications service to be like the simulation, as shown at conditional block 46. If the user changes his/her mind, the user may then continue with the simulation as shown at block 24.

Otherwise, a list of the steps necessary for manual configuration of the telecommunications service is provided to the user, as shown at block 48. The user may then print the list, or save it to a disk/file, for use in configuring the service at a later data, as shown at block 50. The user may then return to the simulation, conditional block 52, return to the menu of available simulations, conditional block 54, or end the program.

Returning to conditional block 44, if automatic configuration of the service is available, and the user wishes to use it, as shown at conditional block 56, then the simulation program sends a message to the server which then requests additional information from the user to insure authentication, as shown at block 58. Such information may include a personal identification number (PIN), a social security number, mother's maiden name, etc. The user would then provide the requested authentication, e.g., by filling out and submitting a Web form page, as shown at block 60. At block 62, the server then communicates with the appropriate systems to configure the user's service.

After the user has taken the necessary steps to request that the server configure their service to be the same as their simulated service, the user can either choose to return to the simulation program, conditional block 52, return to the menu of available simulations, conditional block 54, for selection of a new simulation program, or end the interaction.

The present invention provides subscribers to telecommunications services an opportunity to learn about the benefits of features of their services that they did not know how to use or of which they were not taking advantage. In addition, the invention provides potential subscribers an opportunity to learn about services and their features and thus facilitates their ordering of services due to a favorable experience using the corresponding interactive simulation.

While the best modes for carrying out the invention have been described in detail, those familiar with the art to which this invention relates will recognize various alternative designs and embodiments for practicing the invention as defined by the following claims.

What is claimed is:

1. For use with a client/server data network, a computerized method for interactively simulating a plurality of telecommunications services to a user, the method comprising:

establishing a plurality of simulation programs at the server that corresponds to the plurality of telecommunications services, each simulation program having a browser executable format;

sending a first message to the server over the data network;

displaying a first screen in response to the first message wherein the first screen allows the user to select any one of the plurality of telecommunications services for simulation;

sending a second message to the server indicating selection of one of the plurality of telecommunications services;

receiving a selected simulation program from the server in response to the second message, the selected program corresponding to the selected one of the plurality of telecommunications services;

executing the selected program within a browser on the client.

2. The computerized method as recited in claim 1 further comprising:

displaying a second screen having a plurality of options associated with the selected one of the plurality of telecommunications services based on the selected simulation program.

3. The computerized method as recited in claim 2 wherein displaying the second screen includes displaying screen items providing the user with guidance in using the selected simulation program.

4. The computerized method as recited in claim 2 wherein displaying the second screen options includes playing an audio signal.

5. The computerized method as recited in claim 2 further comprising:

sending a third message indicating selection of one of the plurality of options; and receiving a third screen based on the third message.

6. The computerized method as recited in claim 5 wherein the user subscribes to the selected one of the plurality of telecommunications services and the method further comprising:

sending a fourth message indicating a desire to configure the selected one of the plurality of telecommunications services subscribed to by the user.

7. The computerized method as recited in claim 6 further comprising:

receiving a fourth screen based on the fourth message, the fourth screen representative of the steps required to manually configure the selected one of the plurality of telecommunications services according to at least the third message.

8. The computerized method as recited in claim 6 further comprising:

receiving a fifth screen in response to the fourth message indicating a need for predetermined information; and sending a fifth message containing the predetermined information.

9. The computerized method as recited in claim 6 further comprising:

automatically configuring the selected one of the plurality of telecommunications services in response to the fourth message.

10. A system for interactively simulating a plurality of telecommunications services to a user over a client/server data network, the system comprising:

a plurality of simulation programs at the server that corresponds to the plurality of telecommunications services, each simulation program having a browser executable format;

a client computer for sending a first message to a server;

a display coupled to the client computer for displaying a first screen transmitted by the server in response to the first message wherein the first screen allows the user to select any one of the plurality of telecommunications services for simulation; and the client computer for sending a second message to the server computer indicating selection of one of the plurality of telecommunications services and for receiving a selected simulation program in response to the second message, the selected simulation program corresponding to the selected one of the plurality of telecommunications services, wherein client computer is programmed to execute a browser and to execute the selected program within the browser.

11. The system as recited in claim 10 wherein the display is further operative to display a second screen having a plurality of options associated with the selected one of the plurality of telecommunications services based on the selected simulation program.

12. The system as recited in claim 11 wherein the display is further operative to display a plurality of screen items providing the user with guidance in using the selected simulation program.

13. The system as recited in claim 11 wherein the system further includes a speaker coupled to the client computer for playing an audio signal.

14. The system as recited in claim 11 wherein the client computer is further operative to send a third message indicating selection of one of the plurality of options and the display is further operative to display a third screen in response to the third message.

15. The system as recited in claim 14 wherein the user subscribes to the selected one of the plurality of telecommunications services and wherein the client computer is further operative to send a fourth message indicating a desire to configure the selected one of the plurality of telecommunications services subscribed to by the user.

16. The system as recited in claim 15 wherein the display is further operative to display a fourth screen in response to the fourth message, the fourth screen representative of the steps required to manually configure the selected one of the plurality of telecommunications services according to at least the third message.

17. The system as recited in claim 15 wherein the display is further operative to display a fifth screen in response to the fourth message indicating a need for predetermined information and wherein the client computer is further operative to send a fifth message containing the predetermined information.

18. The system as recited in claim 15 wherein the server is further operative to automatically configure the selected one of the plurality of telecommunications services in response to the fourth message.

* * * * *